US005574845A

United States Patent [19]
Benson et al.

[11] Patent Number: 5,574,845
[45] Date of Patent: Nov. 12, 1996

[54] METHOD AND APPARATUS VIDEO DATA MANAGEMENT

[75] Inventors: Daniel C. Benson, Lawrenceville; Arturo A. Pizano, Belle Mead; Farshid Arman, Hamilton; Remi DePommier, Plainsboro, all of N.J.

[73] Assignee: Siemens Corporate Research, Inc., Princeton, N.J.

[21] Appl. No.: 346,453

[22] Filed: Nov. 29, 1994

[51] Int. Cl.$^6$ ................................................. G06F 15/00
[52] U.S. Cl. .......................... 395/118; 395/501; 395/348; 395/601
[58] Field of Search ........................... 395/152, 154–161, 395/600; 348/12–13; 358/310–311

[56] References Cited

PUBLICATIONS

"Data Modeling of Time–Based Media", Gibbs et al., Visual Objects (ed. D. Tsichritzis), University of Geneva, 1993, pp. 91–102.

"Audio/Video Databases: An Object–Oriented Approach", Gibbs et al., Proc. Ninth In'tl Conf. on Data Engineering, 1993, pp. 381–390.

*Primary Examiner*—Mark R. Powell
*Assistant Examiner*—John E. Breene
*Attorney, Agent, or Firm*—Adel A. Ahmed

[57] ABSTRACT

A computer-implemented method for use by a viewer for the management of video data in a stored video stream, the video stream including a plurality of video shots wherein each shot comprises a sequence of frames, the comprises defining and storing in memory on a frame-sequence axis a time-based model of the video stream; defining and storing in memory on the frame-sequence axis at least one of a space-based model of the video stream, an object-based model of the video stream, and an event-based model of the video stream. The method further comprises selectively scanning through such of the models as have been defined; identifying time, space, object, and/or event segments of interest in such of the models as have been defined; and selecting for viewing portions of the video stream associated with the segments of interest.

24 Claims, 15 Drawing Sheets

TIME

SPACE

OBJECT

EVENT

METHOD AND APPARATUS VIDEO DATA MANAGEMENT

The present invention relates to the management of video data and, more particularly, to the systematic description and viewing of information contained in video streams.

It is a difficult task in managing large collections of video data to be able to retrieve desired segments of video data. A common approach used at the present time is to associate meta-data, or information descriptors, with video segments. It is then a relatively straightforward matter to process meta-data using conventional search engines. However, this leads to problems in defining appropriate meta-data for each video stream, generating the meta-data, and using it to search and view selected segments.

In general, video content can pertain to any subject matter but there are several cases in which groups of video streams share common features such as temporal structure, persons or objects appearing in the video, physical layout or setting, or specific events and actions. Examples include daily news-casts, sporting events, talk shows, or even recordings made from security cameras. In each case, a general domain knowledge of the video content is available, but much of the specific detail is not known until the video is actually viewed.

Recent work done on the analysis and description of video content is described in the following works cited by way of example and whereof the disclosure is herein incorporated by reference as background material: Gibbs, S., Breiteneder, C., Tsichritzis, D., "Audio/Video Databases: An Object-Oriented Approach," Proc. Ninth Intl. Conf. on Data Engineering, 1993, pp. 381–390; Gibbs, S., Breiteneder, C., Tsichritzis, D., "Data Modeling of TIme-Based Media," Visual Objects (ed. D. Tsichritzis), University of Geneva. 1993.

In accordance with an aspect of the invention, a computer-implemented method for use by a user for the management of video data in a stored video stream, the video stream including a plurality of video shots wherein each shot comprises a sequence of frames, comprises the steps of:

(a) defining and storing in memory on a frame-sequence axis a time-based model of the video stream;

(b) defining and storing in memory on the frame-sequence axis at least one of
  (1) a space-based model of the video stream,
  (2) an object-based model of the video stream, and
  (3) an event-based model of the video stream;

(c) selectively scanning through such of the models as have been defined;

(d) identifying time, space, object, and/or event segments of interest in such of the models as have been defined; and (e) selecting for viewing portions of the video stream associated with the segments of interest.

In accordance with another aspect of the invention, step (a) comprises loading the time-based model of the video stream in a Time Browser for display to the user for selectively scanning.

In accordance with another aspect of the invention, step (b) comprises loading at least one of the space-based model of the video stream, the object-based model of the video stream, and event-based model of the video stream into a respective browser for display to the user for selectively scanning.

In accordance with a further aspect of the invention, apparatus including computer for use by a user for the management of video data in a video stream stored in a video library, the video stream including a plurality of video shots wherein each shot comprises a sequence of frames, comprises video selector apparatus for selecting a video by the user from a video library; video server apparatus for accessing the video library; video player apparatus coupled to the video server apparatus and to the video selector apparatus for defining and storing in the video library on a frame-sequence axis a time-based model of the video stream; the video player apparatus being coupled to the video selector apparatus for defining and storing in the video library on the frame-sequence axis at least one of (1) a space-based model of the video stream, (2) an object-based model of the video stream, and (3) an event-based model of the video stream; browser apparatus for enabling the user to selectively scan through such of the models as have been defined and select segments of interest therefrom; and filter apparatus for selecting for viewing portions of the video stream associated with the segments of interest.

In accordance with another aspect of the invention, the video player accepts requests from the user and translates them into commands for the video server.

In accordance with yet a further aspect of the invention, the video player includes a viewing device and decodes the video data and displays it in the viewing device.

In accordance with another aspect of the invention, apparatus including computer for use by a user for the management of video data in a video stream stored in a video library, the video stream including a plurality of video shots wherein each shot comprises a sequence of frames, comprises video selector apparatus for selecting a video by the user from a video library; video server apparatus for accessing the video library; video player apparatus coupled to the video server apparatus and to the video selector apparatus for defining and storing in the video library on a frame-sequence axis at least one of (1) a time-based model of the video stream,
(2) a space-based model of the video stream,
(3) an object-based model of the video stream, and
(4) an event-based model of the video stream; browser apparatus for enabling the user to selectively scan through such of the models as have been defined and select events of interest therefrom; and filter apparatus for selecting for viewing portions of the video stream associated with the segments of interest.

In accordance with still a further aspect of the invention, a computer-implemented method for use by a user for the management of video data in a stored video stream, the video stream including a plurality of video shots wherein each shot comprises a sequence of frames, comprises the steps of:

(a) retrieving from a database a list of sequences available;

(b) building a selection window;

(c) loading into a memory device a user selected of one of the sequences;

(d) hiding the selection window;

(e) showing a display window for displaying the user selected one of the sequences;

(f) displaying the user selected one of the sequences;

(g) entering a user command to play the selected one of the sequences;

(h) entering a user command for selecting a given portion of the selected one of the sequences; and (i) entering a user command for selecting at least one of (1) a space-based model of the video stream,
(2) an object-based model of the video stream, and
(3) an event-based model of the video stream.

In accordance with another aspect of the invention, apparatus for use by a user for the management of video data in a stored video stream, the video stream including a plurality of video shots wherein each shot comprises a sequence of frames, includes apparatus for entering user commands and comprises:

retrieval apparatus for retrieving from a database a list of sequences available;

stored software apparatus for building a selection window;

apparatus for loading into a memory device a user selected of one of the sequences;

apparatus for hiding the selection window;

display apparatus for showing a display window for displaying the user selected one of the sequences;

stored software apparatus for implementing at least one of a user-selectable space-based model of the video stream,
a user-selectable object-based model of the video stream, and
a user-selectable event-based model of the video stream.

In accordance with still yet a further aspect of the invention, a method for use by a user for the management of video data in a stored video stream implemented on computer controlled apparatus including video replay apparatus, the video stream including a plurality of video shots wherein each shot comprises a sequence of frames, comprises the steps of:

(a) retrieving from a database a list of sequences available;

(b) building a sequence selector;

(c) loading a user-selcted sequence;

(d) displaying the user-selected sequence;

(e) entering a user command for selecting one of
(1) an event-based model of the video stream,
(2) a space-based model of the video stream, and
(3) an object-based model of the video stream.

In accordance with a further aspect of the invention, the method comprises the steps of:

(f) displaying an event-based screen, including event-based icons; and (g) displaying the user-selected sequence in accordance with user selection of events indicated by the icons.

In accordance with yet a further aspect of the invention, the method comprises the steps of:

(f) displaying a space-based screen, including space-based icons; and (g) displaying the user-selected sequence in accordance with user selection of spaces indicated by the icons.

In accordance with still a further aspect of the invention, the method comprises the steps of:

(f) displaying an object-based screen, including object-based icons; and (g) displaying the user-selected sequence in accordance with user selection of objects indicated by the icons.

The invention will be best understood from the following detailed description in conjunction with the Drawing, of which FIG. 1 shows diagrammatically a raw video stream comprising synchronized video, audio, and closed-caption tracks;

Figure 9:
Figure 8:
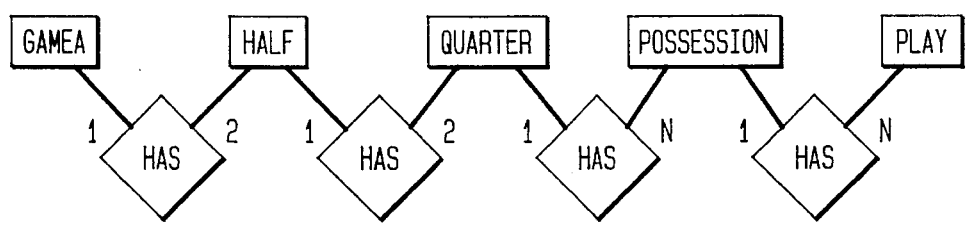

FIG. 8 presents a hierarchy used to describe the time model in terms of the game time for a football game in accordance with an exemplary embodiment of the present invention, and shows an Entity-Relationship diagram describing the game-time hierarchy of temporal concepts for a football game;

FIG. 9 presents an organization of core knowledge associated with the space model to describe a football field, in accordance with an exemplary embodiment of the present invention, and shows Entity-Relationship diagram describing a football field in terms of a one dimensional abstraction to represent yard lines.

Figure 10:
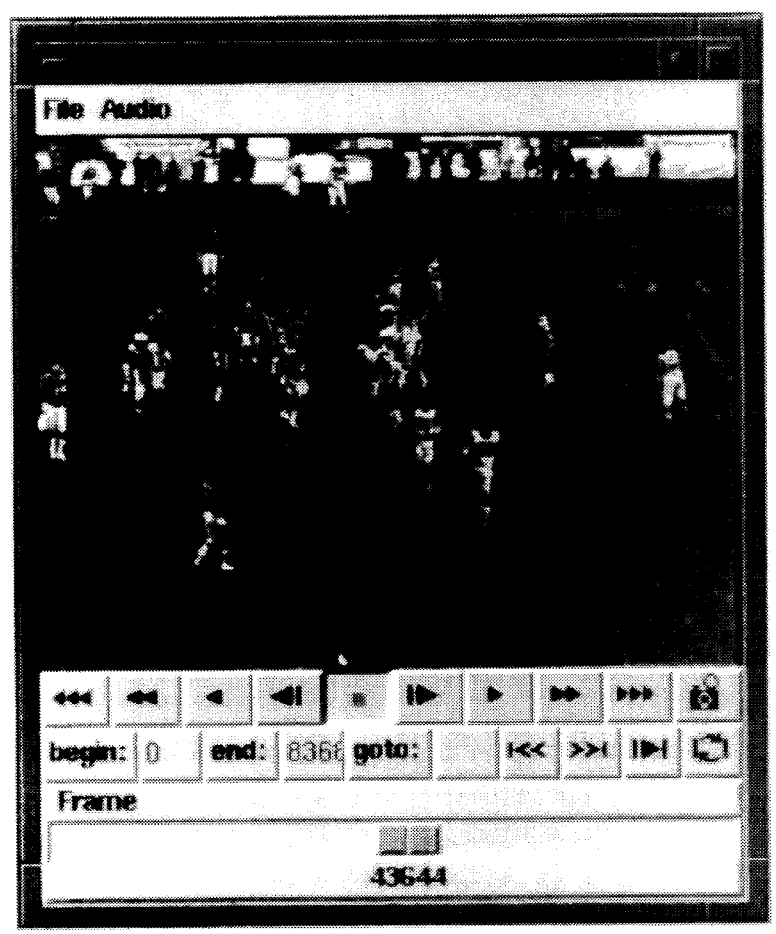
Figure 11:
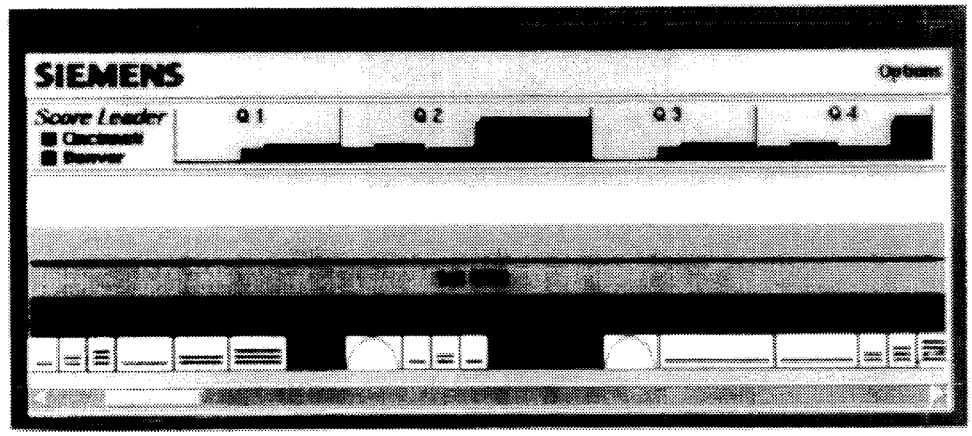
Figure 12:
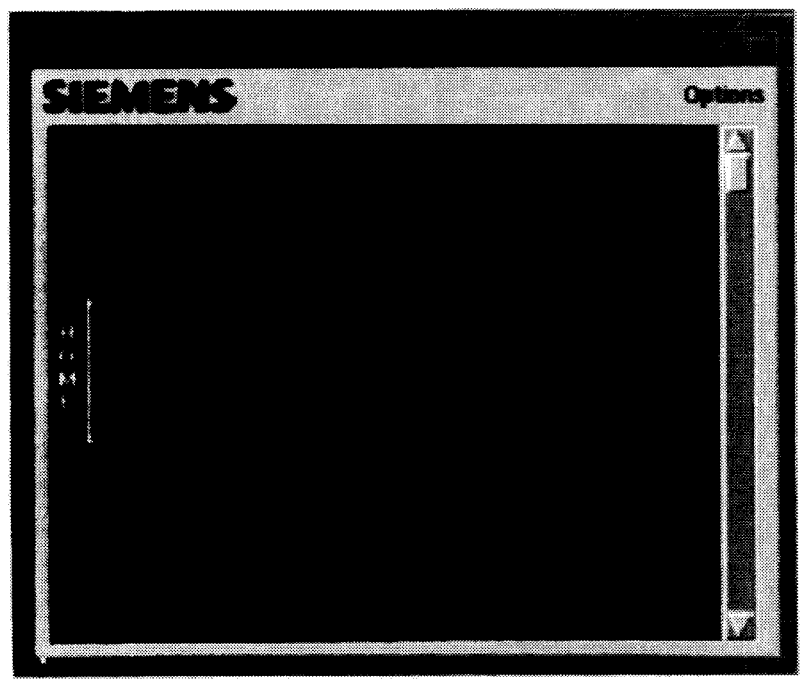
Figure 13:
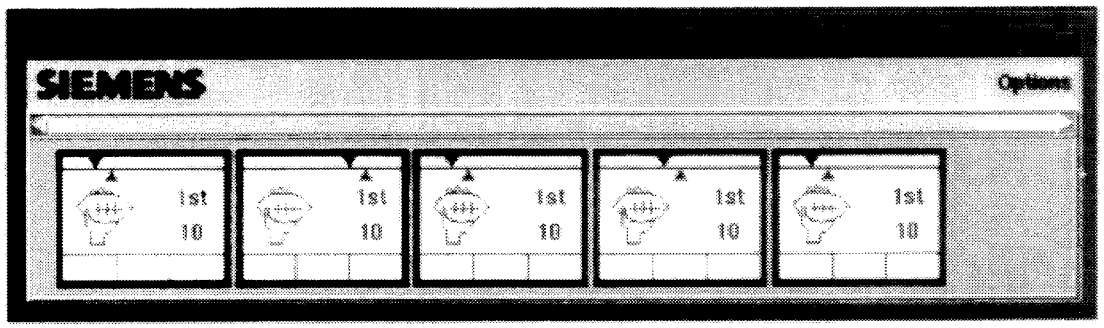
Figure 14:
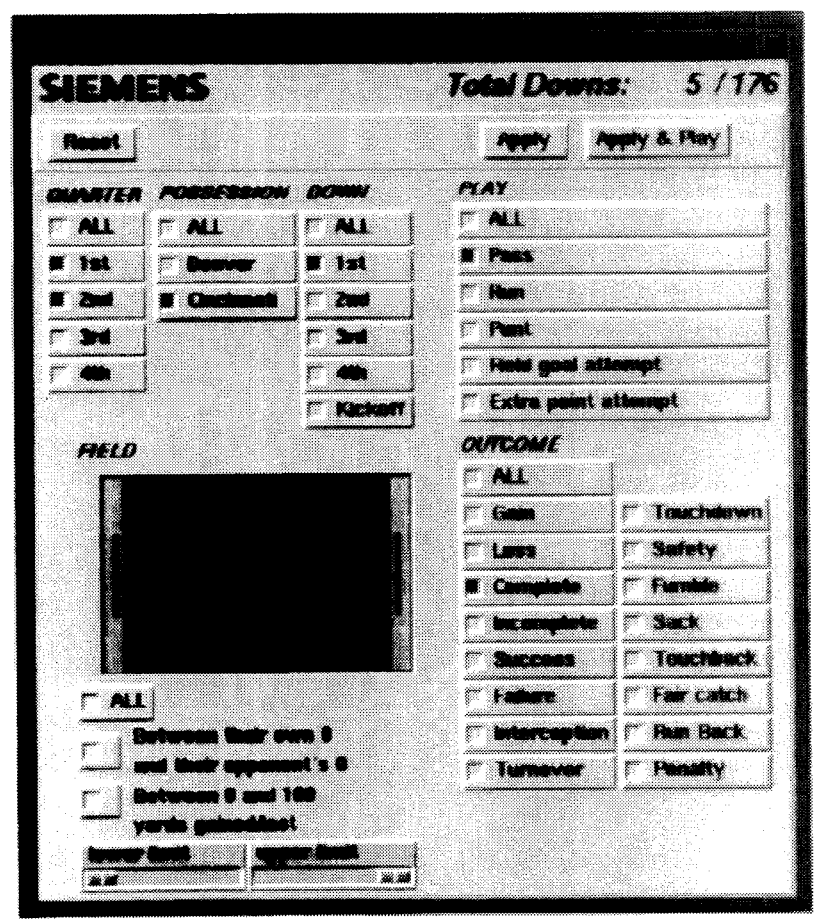
Figure 16:
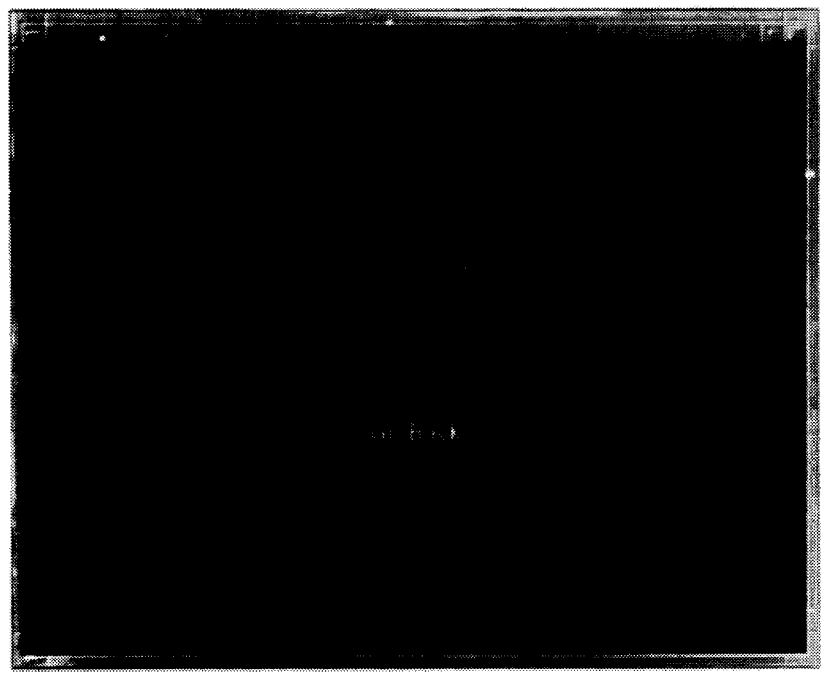
Figure 17:
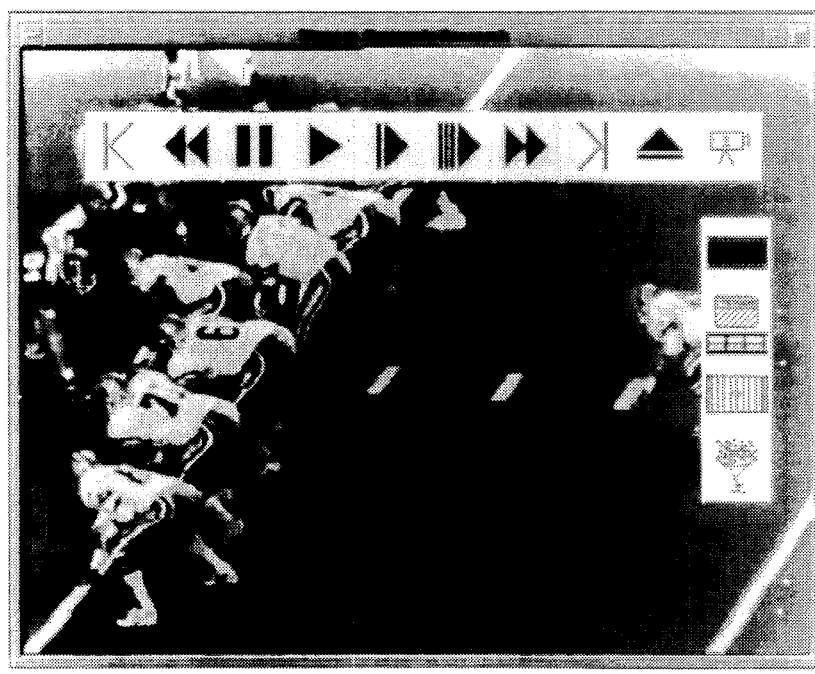
Figure 21:
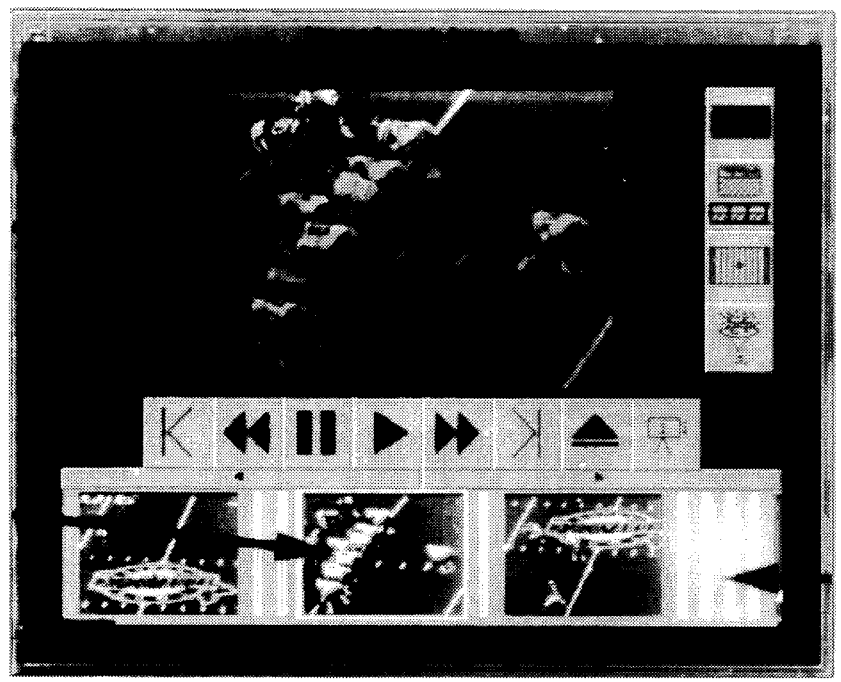
Figure 22:
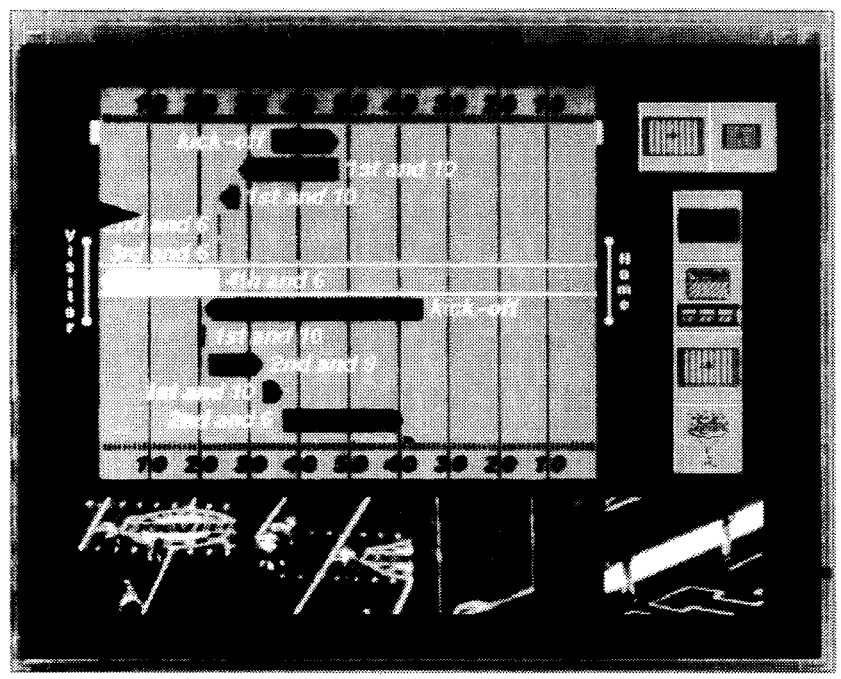
Figure 23:
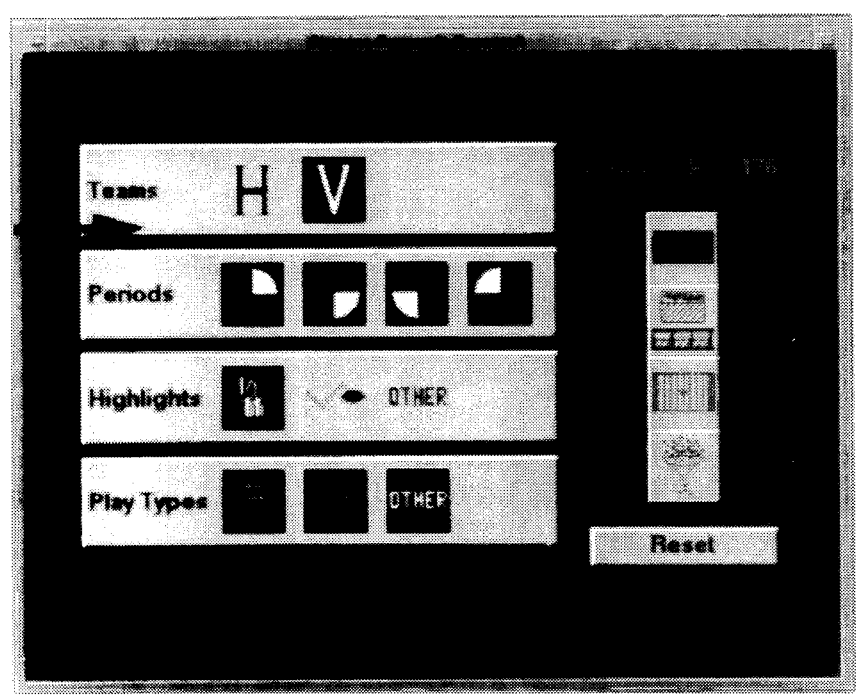

FIG. 10 shows a Video Player component of the Structured Video Content Viewing System, in accordance with an exemplary embodiment of the present invention, and provides conventional VCR controls as well as NextEvent and PreviousEvent that are unique to the event model;

FIG. 11 shows a Time Browser component of the Structured Video Content Viewing System in accordance with an exemplary embodiment of the present invention;

FIG. 12 shows a Space Browser component of the Structured Video Content Viewing System in accordance with an exemplary embodiment of the present invention, where a football field is shown with individual plays appearing as arrows that extend from the initial line of scrimmage to the resulting yards gained or lost;

FIG. 13 shows an Event Browser component of the Structured Video Content Viewing System in accordance with an exemplary embodiment of the present invention, wherein individual events are arranged in time horizontally with each event represented as an iconic abstraction;

FIG. 14 shows a Filter component of the Structured Video Content Viewing System;

FIGS. 15, 18, 19, and 20 show respective flow charts A, B, C, and D in accordance with an exemplary embodiment of the present invention;

FIG. 16 shows a Main Viewing Window in accordance with an exemplary embodiment of the present invention;

FIG. 17 shows a Game Player Screen in accordance with an exemplary embodiment of the present invention;

FIG. 21 shows a Play Browser Screen in accordance with an exemplary embodiment of the present invention;

FIG. 22 shows a Space Browser Screen in accordance with an exemplary embodiment of the present invention; and FIG. 23 shows a Filter Screen in accordance with an exemplary embodiment of the present invention.

As part of the description following of the invention, the basic definitions about the structure and content of video will be provided and the use in accordance with the present invention of four content models based on time, space, object, and event will be introduced. A Structured Video Viewing System in accordance with the invention will be explained and a description provided of various components that support the content models. The invention will be further explained by way of an illustrative embodiment based on an American football game video.

In accordance with an aspect of the present invention, advantage is taken of a priori knowledge to help guide the generation and use of meta-data. This is captured in what is herein referred to as the Core Knowledge. Furthermore, the Core Knowledge is divided into four primary models: temporal, spatial, object, and event.

These domain knowledge models are used during the pre-processing of the video streams to generate the meta-data when first entered into the database and are also used to organize, search, and browse through the collections of videos based on their contents.

Thus, domain knowledge of the video material is utilized by the invention in terms of entities expected to be found in the video (objects, events, temporal and spatial properties) and the relationships between these entities.

Figure 1:
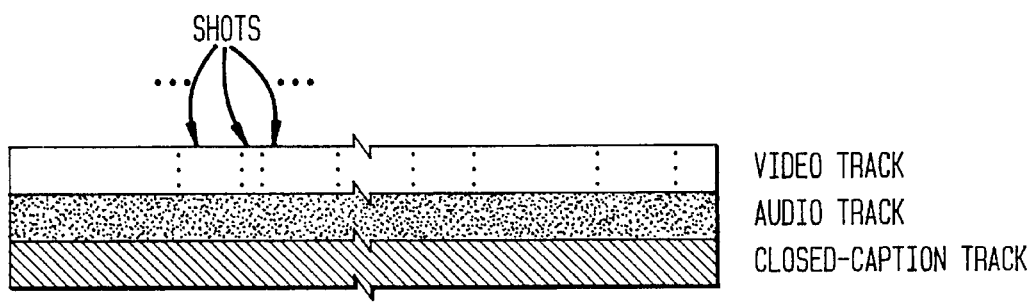
Figure 2A:
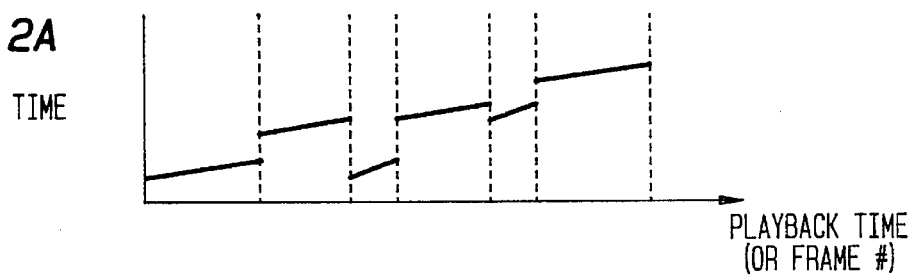
FIG. 2 shows four models used in accordance with the present invention to describe structured video content: Time, Space, Object, and Event.
Figure 2B:
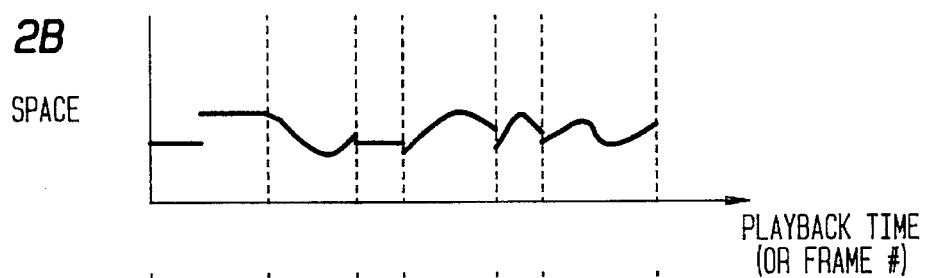
Figure 2C:
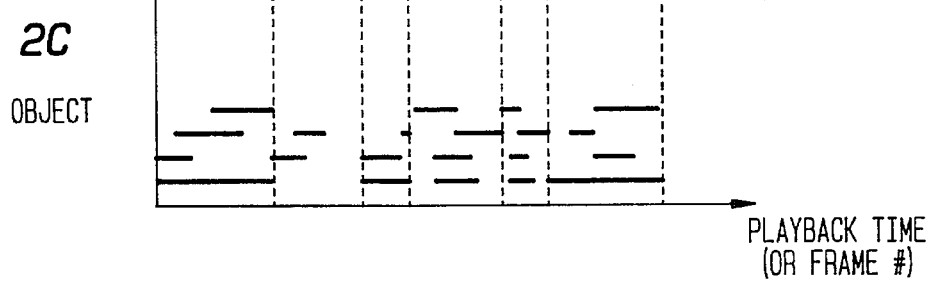
Figure 2D:
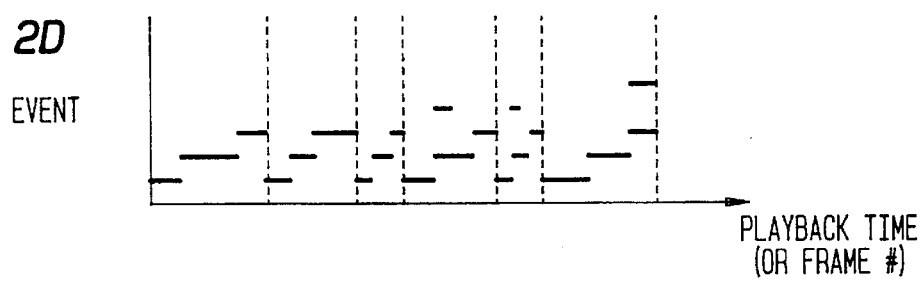

In terms of the medium itself, a video stream comprises a video track or sequence of frames, one or more audio tracks which may sometimes be silent and, in some cases, a closed-caption track for subtitle generation during playback as indicated in FIG. 1, which shows raw video stream comprising synchronized video, audio, and closed-caption tracks.

Together, these synchronized tracks capture the content of the video, each contributing a portion of the information conveyed during playback. The video track of an edited video stream is made up of individual shots that are spliced together, where a shot is defined as a contiguous sequence of frames or, for simplicity, the frame sequence recorded between turning a camera on and then off.

However, video content is more than simply the medium. To illustrate, if a user is told that a certain video is a recording of a football game, the user immediately has a general idea of the content of the video, what they can expect to see and hear and the general sequence of events. If the user is then told that the game is played between professional teams, the user's conception is changed to exclude college or high school games. If the user knows the names of the teams, they may already be familiar with the individual players and coaches, and so on. Thus, without even having seen the video, the user has a good general idea of what they can expect to see.

A video stream is herein referred to as structured video when it is composed of a known sequence of events based on its subject matter or a known sequence of segments based on its composition, as follows.

Subject-Structured:

The video comprises a known ordering of events that may or may not be presented in a contiguous fashion. An example of this type of video is a broadcast of a football game. The game has a known sequence of events: Kickoff, 1st Quarter, 2nd Quarter, Kickoff, 3rd Quarter, 4th Quarter, Overtime, but the actual recording may include additional material such as replays, crowd shots, commercials, or commentaries that are interspersed with the actual game segments.

Composition-Structured:

The video consists of a known ordering of contiguous segments. One example of this type of structured video is a nightly newscast that follows the same pattern, for example, news headlines, local news, commercials, national news, commercials, sports, commercials, weather, commercials, sign off, and so forth. Another example is a set of security cameras feeding signals into a single recording that automatically cycles through each camera at a fixed rate throughout the day. The known sequence of segments is the order of camera cycling.

Four parameterized models are defined: time, space, object, and event, that are used to describe both general and specific knowledge about the content of a given structured video. The time model refers to the recording time relative to the content, as opposed to the playback time of the video itself. The space model refers to the physical settings or locations of the recording. The object model refers to the different types of objects appearing in the video. The event model refers to the various events that take place in the video. All four of the models share the common attribute of frame sequence, which is identical to the playback time axis. Each of these models is described in the sections that follow. See also FIG. 2, which shows the four models used to describe structured video content: Time, Space, Object, and Event.

With regard to the Time Model, there are several ways to consider the notion of "time" when it comes to video recordings. One way is to refer to the playback time. This tracks in exact correspondence with the frame sequence of the video stream, which ranges from 0 to the total number of frames in the sequence. The playback time would begin at time 00:00 and increase linearly depending on the number of frames per second.

Another way is to refer to the recording time, which can vary depending on the video content and context. A simple interpretation is herein referred to as the clock time, or the absolute time the recording was made. Other interpretations of recording time will depend on the specific video content and context. The various interpretations of recording time can be illustrated with an example of a commercial broadcast American football game.

Figure 3A:
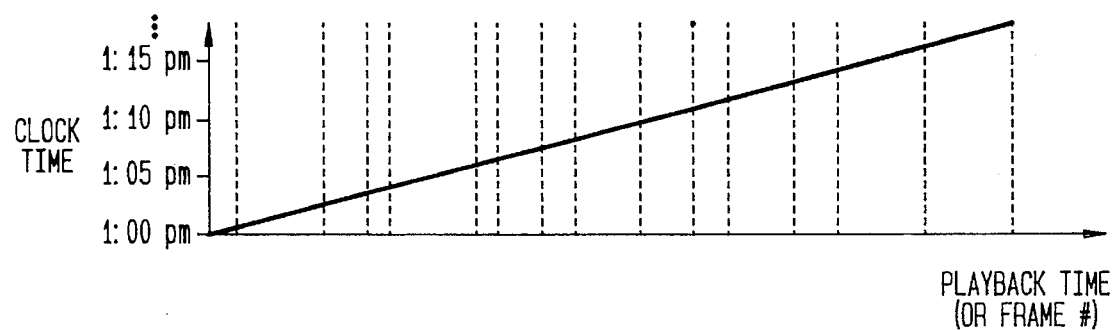
FIG. 3 shows two interpretations of time for a commercial broadcast American football game: a) clock-time and b) game-time.
Figure 3B:
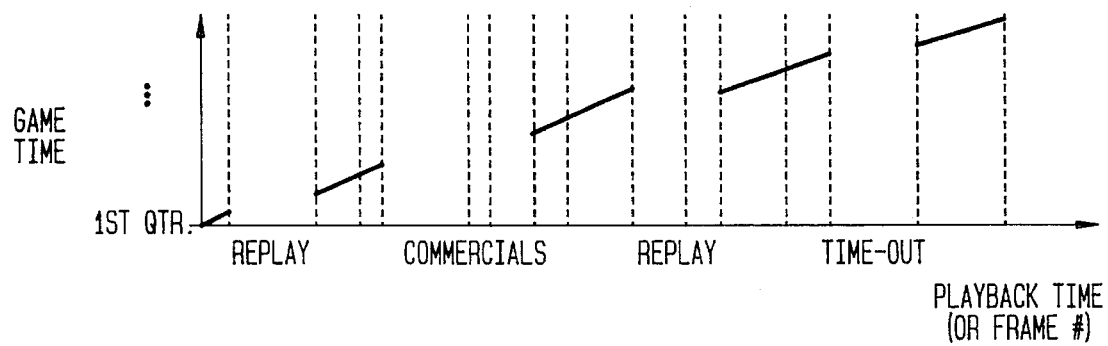

Suppose the broadcast began at 1 pm and ended at 4 pm. This would be the clock time interpretation of the game. Considering now the content of the broadcast, it may be that the actual game-time is of interest, which consists of 4 quarters of 15-minutes each. In other words, the game-time axis would range from 1st quarter to 4th quarter, with possible overtimes. When viewed this way, it may be found that perhaps only 40% of the recorded broadcast contains the actual game in progress, the rest consisting of instant replays, time-outs, commercial breaks, half-time show, highlights of other games, etc. See FIG. 3 which shows two interpretations of time for a commercial broadcast American football game: a) clock-time and b) game-time: a) time model using the clock-time of the broadcast. The mapping between recording time and playback time is linear; b) time model using the game-clock of the football game; gaps indicate moments when the game events have stopped, e.g. replays, commercial breaks, time-outs, etc. and the mapping between recording time and playback time is linear but broken into short segments spread across the playback time axis;

With regard to the space model, this is based on the video content setting or physical location. A given video will typically have one or more space models that may be three-, two-, or one-dimensional abstractions, or symbolic representations. For instance, the space models for a newscast program might include one model for the news room and several symbolic models depicting the various reporting sites, such as the White House, a courthouse, or the site of a plane crash.

Figure 4:
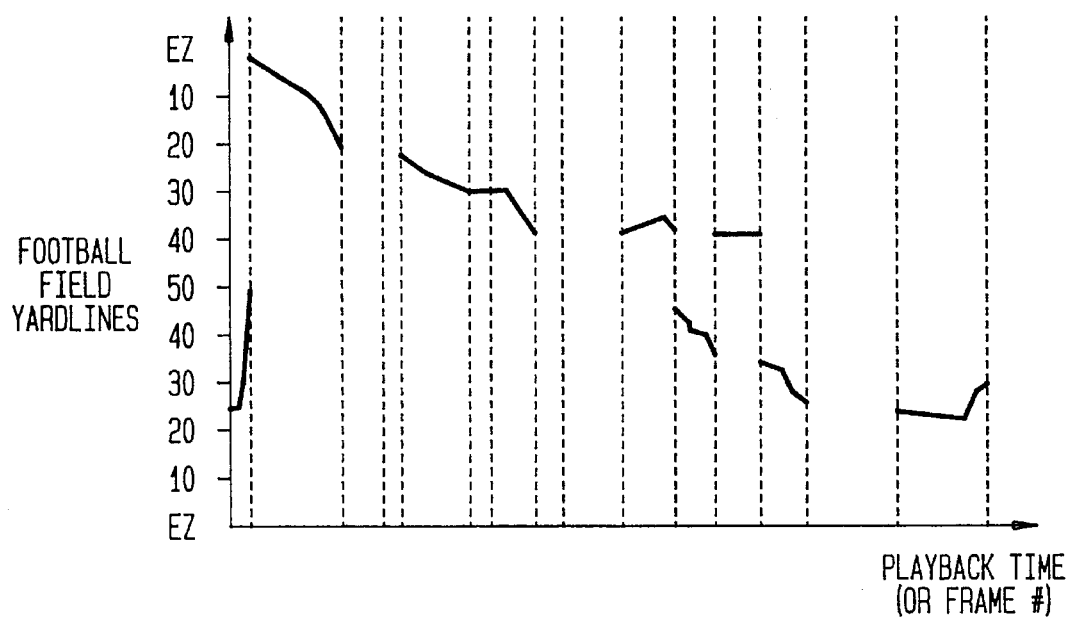
FIG. 4, shows a Space model in accordance with an exemplary embodiment of the present invention, defined as the football field in terms of the yardlines and endzones.

In general, the space model captures where the camera is pointing. Using the football game example, the space model might be defined as the football stadium. A more specific model might only be the football field in terms of the yardlines and endzones. Note that curved lines on a space model graph indicate camera motions such as panning, tilting, tracking and dollying. See FIG. 4, which shows a Space model defined as the football field in terms of the yardlines and endzones. Lines only appear for segments containing scenes of the football field. Curved lines indicate camera motion, such as when following the ball, whereas flat lines indicate fixed cameras locked on one scene.

Figure 5:
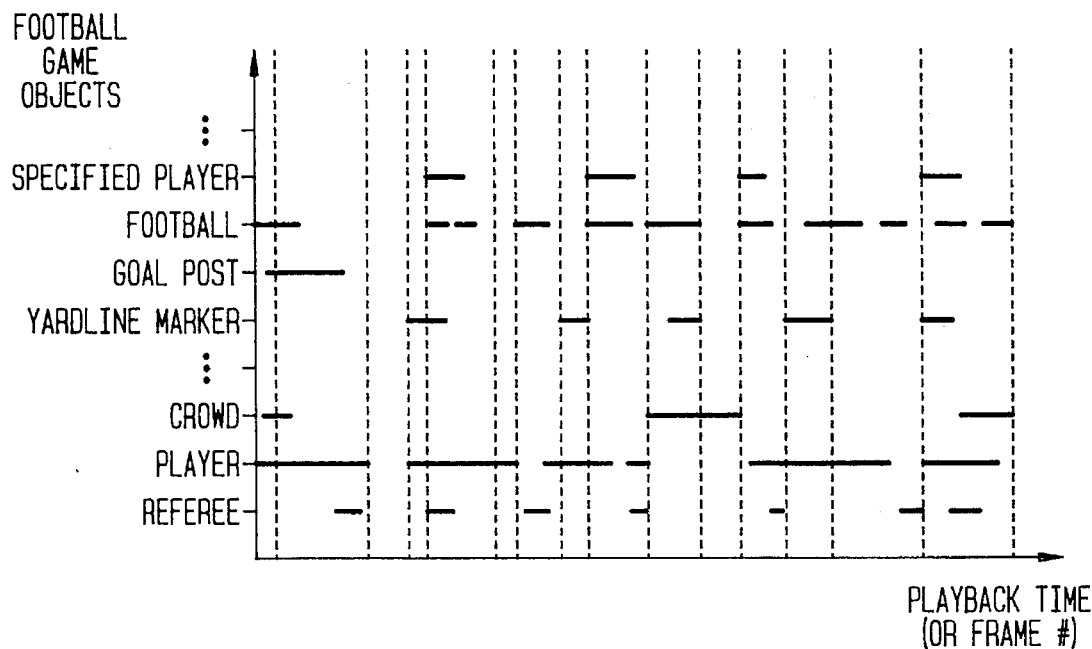
FIG. 5 shows examples of object models for a football game, in accordance with an exemplary embodiment of the present invention wherein lines indicate the beginning and ending frame numbers in which the object appeared in a video.

The object model describes the various objects appearing in the video. A given video will typically have several object models that may range from very specific objects, for example, a star football player, a football, a yardline marker, or a goalpost, to more general objects, for example, a crowd, a player, or a referee. Using the football example, the graph of an object model indicates the segments in which the object appears. See FIG. 5 which shows examples of object models for a football game. Lines indicate the beginning and ending frame numbers in which the object appeared in the video.

The event model describes various events that take place in a video. A given video will typically have several event models that may vary in complexity and duration. For example, events in a newscast might include headlines, national news, live report, stock market report, etc. In this example, note that the event model defines the types of events whereas the time model defines the order in which they appear.

Figure 6:
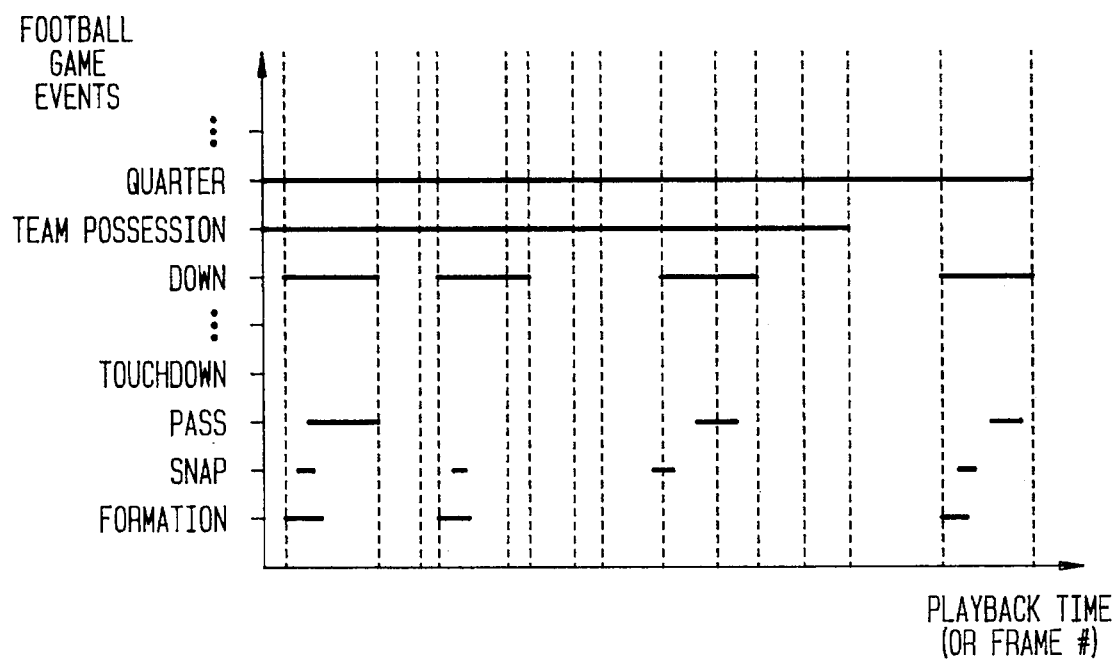
FIG. 6 shows examples of event models for a football game, in accordance with an exemplary embodiment of the present invention, wherein lines indicate the beginning and ending frame number in which the event took place in the video.

A football game might define several types and levels of events. Small, simple events might include such items as huddle, snap, pass, run, tackle, touchdown, field goal, penalty, etc. Larger, more complex events might include game, half, quarter, possession, down, etc. FIG. 6 shows examples of event models for a football game. Lines indicate the beginning and ending frame numbers in which the event took place in the video.

As to the use of the content model, while the foregoing provides a description of the four content models individually to distinguish their respective attributes this is not to say that they can only be regarded as separate constructs. The fact that these models are used to describe information in the same video content means that they themselves will be inter-related in some way. In particular, the event model will most likely be a higher-level model describing interactions among objects as they appear in space over time. Furthermore, the use of any particular model is determined by the application and no model is a prerequisite for another model. For instance, if object appearance is the only information desired for a particular application, then only the object model is needed.

The present invention method does not prescribe any particular modeling construct. There are many well-known data models that can be utilized to model structured video content, such as the relational model, the entity-relationship model, or an object-oriented model.

With regard to the viewing of structured video content, it is noted that the main purpose of constructing content models of structured video content is to be able to retrieve desired segments efficiently. The models also provide alternative viewing capabilities and options that are not available with existing video playback systems.

In accordance with the present invention, a structured video content viewing system is herein described that utilizes one or more of the content models to aid in the selecting, browsing, and viewing of structured video. Given a collection of structured videos, their corresponding content models and associated meta-data, a set of viewing tools provides visual cues and navigational aids to access the video based on the content models.

Figure 7:
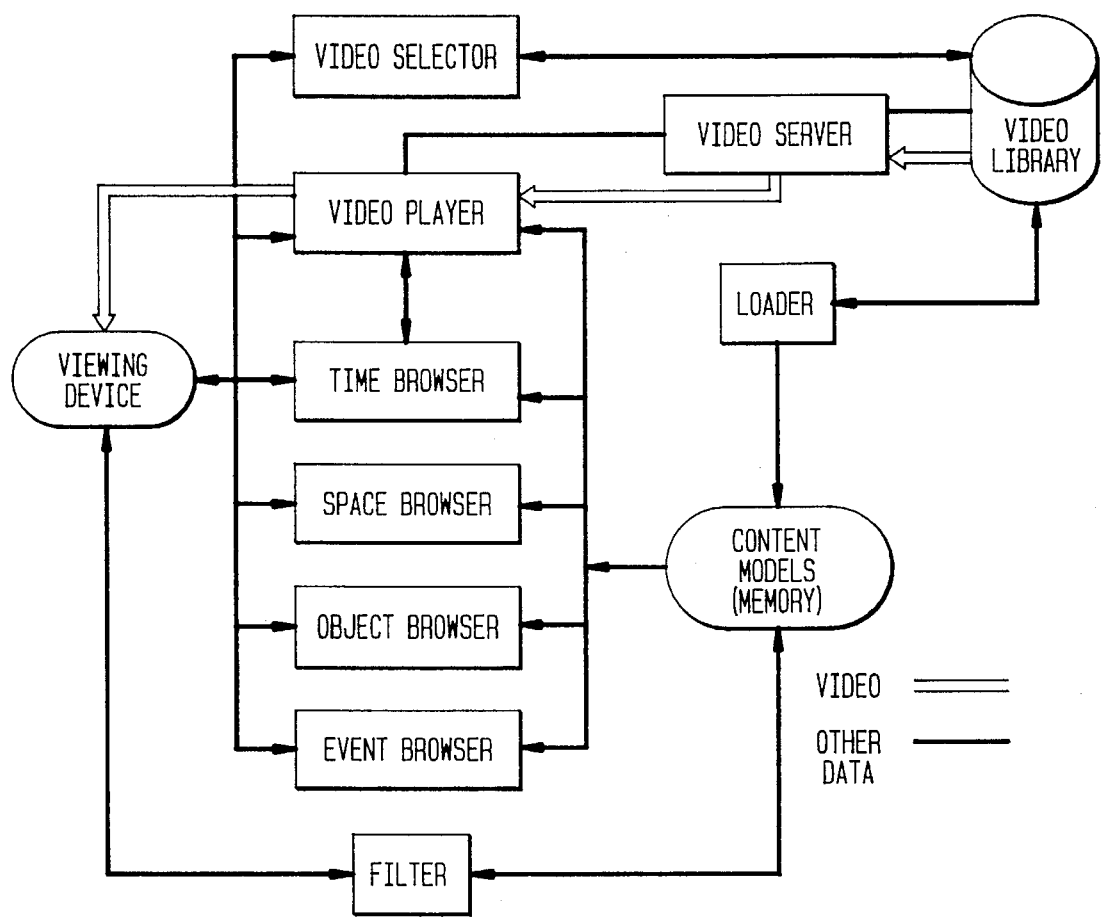
FIG. 7, shows a system for viewing structured video, in accordance with an exemplary embodiment of the present invention, wherein main components are shown as boxes and connections between components indicate video and data flow.

The main components of the system in accordance with the present invention are described as follows, in conjunction with FIG. 7, which shows a system for viewing structured video. Main components are shown as boxes and connections between components indicate video and data flow.

Video Library:
  Storage for collections of video streams and associated meta-data in the form of the four parameterized content models.

Video Selector:
  Enables the selection of a video, or collection of videos, from the video library. This is an interactive module that provides options to the user and interprets requests and selections.

Video Server:
  Retrieves video information from the library and delivers it to the Video Player such that it provides quality of service guarantees that ensure real-time playback of the video material.

Video Player:
  Accepts requests from the viewer and translates them into commands for the Video Server. Decodes the video signal with the assistance of hardware, and displays it in the Viewing Device. Operations supported by this component include:

(1) Standard VCR operations such as Play, Pause, Stop, FastForward, Rewind, Step Forward and Step Back, (2) NextEvent and PreviousEvent (not available in VCRs). These operations enable direct access (jump) to pre-determined points in the video stream associated with events.

(3) Camera selection. In cases where multiple camera streams exist for the same video recording, the Video Player lets the viewer select the preferred angle.

The system supports two playback modes:

"Unrestricted", which enables access to the entire video

"Restricted", which limits the viewing operations to portions of the video previously selected through the Browsers and Filter.

Content Models:
  Internal (main memory) representation of the meta-data models. Used by the Video Player, Browsers and Filter during the interaction with the viewer.

Browsers:
  Provides intuitive paradigms to present the viewer with options on how to view/browse a video based on the structured video content models. A browser can be used to identify specific areas of the video of interest.

Filter:
  Enables the selection of segments of interest. Creates a list of events of interest. The contents of this list are reflected in the Browsers. The set of active events created with the filter also delimits the video shown to the viewer if the restricted playback mode is selected.

In the following, the concepts and definitions introduced above will be illustrated by way of an illustrative and exemplary embodiment based on an American Football On-Demand System built in accordance with the principles of the present invention. Some familiarity with the game of American Football is herein taken for granted; in any event descriptive materials on the game and its rules are common knowledge and are widely available in the literature. A schematic representation of the models used in this domain will be presented and the appearance and behavior of the various browsers will be illustrated. In the following, the existence is assumed of certain tools that facilitate the implementation of the system. These tools, in particular, the entity-relationship (ER) model and object-oriented model used to describe the structure of a football game, are inter-changeable components that can be replaced with similar tools while maintaining the functionality of the system. For example, instead of using an ER approach to describing the game, it is readily possible to use a semantic network approach.

FIG. 8 presents the hierarchy used to describe the time model in terms of the game time for a football game. It shows an Entity-Relationship diagram describing the game-time hierarchy of temporal concepts for a football game.

FIG. 9 presents the organization of core knowledge associated with the space model to describe a football field. It shows Entity-Relationship diagram describing a football field in terms of a one-dimensional abstraction to represent yard lines. In this case, the axis parallel to the width of the field is ignored.

With regard to the Object Model, the following convention is used to describe object classes and their attributes:

SuperClass: Subclass
    attribute: primitive data type or class name Class names are capitalized and primitive data types are lower case.
    Subclasses inherit attributes from their superclasses.

The following is a list of objects and their attributes for a given football game.

| Team | |
|---|---|
| name | string |
| coach | Coach |
| roster | Set of Player |
| logo | image |
| home_uniform | image |
| visitor_uniform | image |

| Position | |
|---|---|
| name | { } |
| Position | OffensivePosition |
| name | {WR, LT, LG, X, RG, RT, TE, WR, QB, RB} |
| Position | DefensivePosition |
| name | {LE, NT, RE, MLB, RLB, DB, LCB, RCB, SS, FS} |

| Lineup | |
|---|---|
| starting | Set of (Association of Position and Player) |
| substitutions | Set of (Association of Position and Player) |

| Player | |
|---|---|
| name | string |
| number | integer |
| team | Team |
| position | Position |

| Coach | |
|---|---|
| name | string |
| team | Team |

| Stadium | |
|---|---|
| name | string |
| location | string |
| covered | Boolean |
| artificial_turf | Boolean |

| Official | |
|---|---|
| name | string |
| position | {referee, line judge, head linesman, field judge, umpire, side judge, back judge} |

The following list presents the hierarchy used to describe the event model of a football game. Each event is described as a combination of elements from the time and space models. In particular, we distinguish the following types of events.

| Game | |
|---|---|
| start_frame | integer |
| end_frame | integer |
| type | {exhibition, regular season, playoff, superbowl} |
| home_team | Association of Team and Lineup |
| visiting_team | Association of Team and Lineup |
| location | Stadium |
| weather | string |
| halves | OrderedCollection of Half |

| Half | |
|---|---|
| start_frame | integer |
| end_frame | integer |
| number | {1st, 2nd} |
| quarters | OrderedCollection of Quarter |

| Quarter | |
|---|---|
| start_frame | integer |
| end_frame | integer |
| number | {1st, 2nd, 3rd, 4th} |
| events | OrderedCollection of {Play, Timeout, Penalty, ... } |

| Play | |
|---|---|
| start_frame | integer |
| end_frame | integer |
| down | {1st, 2nd, 3rd, 4th, kickoff, extra-point-attempt} |
| yards_to_go | integer |
| line_of_scrimmage | integer |
| possession | Team |
| yards_gained/lost | integer |
| events | OrderedCollection of PlayEvent |

| PlayEvent | |
|---|---|
| start_frame | integer |
| end_frame | integer |
| type | {huddle, snap, pass, run, lateral, fumble, ... } |

| Possession | |
|---|---|
| start_frame | integer |
| end_frame | integer |
| team | Team |
| plays | OrderedCollection of Play |

| Score | |
|---|---|
| start_frame | integer |
| end_frame | integer |
| team | Team |
| type | {touchdown, extra-point, safety} |

FIGS. 10 through 14 illustrate the player, browsers, and filter components that are used to view a football game based on the models described above. FIG. 10 shows the Video Player component of the Structured Video Content Viewing System. It provides conventional VCR controls as well as NextEvent and PreviousEvent that are unique to the event model.

FIG. 11 shows the Time Browser component of the Structured Video Content Viewing System. Game time increases from left to right and hierarchical descriptions of time-based elements are arranged vertically with Play being the smallest unit shown at the bottom. In addition, the number of each play is indicated by the number of horizontal lines and kicks are shown as curves. The top of the window shows a score differential for the various quarters of the game.

FIG. 12 shows the Space Browser component of the Structured Video Content Viewing System. The football field is shown with individual plays appearing as arrows that extend from the initial line of scrimmage to the resulting yards gained or lost. Note the time dimension increases vertically from top to bottom, thereby combining both space and time models.

FIG. 13 shows the Event Browser component of the Structured Video Content Viewing System. Individual events are arranged in time horizontally with each event represented as an iconic abstraction. In this example, the Filter tool was used to select only pass plays that occurred on a first down.

FIG. 14 shows the Filter component of the Structured Video Content Viewing System. This combines elements of the time (quarter, possession, down), space (field), and event (play & outcome) models. In this example, the user has selected to view only 1st down pass plays by Cincinnati that were completed in the first half of the game. The result is 5 out of a total of 176 downs in the game.

The following flow charts illustrate an exemplary embodiment of the structured video viewing method and system in accordance with the invention, using the American football game as a domain:

Flow Chart A shown in FIG. 15 relates to the Main Viewing Window shown in FIG. 16 and will next be described.

Build Game Selector
  Retrieve from the database a list of the games available (a standard data manipulation language, e.g., SQL can be used for this purpose). For example, "College: Brown at Princeton" and "Superbowl XXVIII: Dallas—Buffalo."
  Use this list to build a window as shown in FIG. 16 (an off-the-shelf window environment, e.g., Motif, and off-the-shelf interface building tool, e.g., Tcl/Tk can be used for this purpose)
Wait for Viewer Selection
  Given the screen shown above, the user can use a standard point-and-click device (e.g., a mouse or trackball) or a remote control to select the desired video
    Let gN be the identification number of the game selected
    Load Game
    Given gN retrieve the following information from the database
    Game log (play-by-play) description
    Game icons
Initialize Video Player
  Send the following command to the video player: PlayerCmnd Start.
  It is herein assumed that a video player will be ready to receive commands of the form "PlayerCmnd<command>" from the application. Furthermore, it is assumed that the video player will respond to these commands and return a status code indicating whether the command was successful or not. It is also assumed that the video player will send periodic messages back to the application indicating the frame (or group of frames) being played. A global variable named currentPlay is used to keep track of the play currently being shown by the game player.

Play Game
  Hide the game selector
  Show the window where the video should be played (see the Game Player Screen in FIG. 17).
  Issue the following command: PlayerCmnd Play
Wait for User Commands
  Continue Playing the game until a command is issued by the viewer by clicking in one of the buttons shown in FIG. 17. Numbered from left to right in the horizontal menu and from top to bottom in the vertical menu, these commands should be interpreted as follows:

| | |
|---|---|
| Horizontal Menu - | Button 1 (Jump to Previous Play) |
| | set currentPlay = currentPlay - 1 |
| | set ff = firstFrame (currentPlay) |
| | PlayerCmnd "Goto $ff" |
| Horizontal Menu - | Button 2 (Rewind) |
| | PlayerCmnd Rew |
| Horizontal Menu - | Button 3 (Pause) |
| | PlayerCmnd Pause |
| Horizontal Menu - | Button 4 (Play) |
| | PlayerCmnd Play |
| Horizontal Menu - | Button 5 (Step) |
| | PlayerCmnd Step |
| Horizontal Menu - | Button 6 (Slow Motion) |
| | PlayerCmnd SlowMotion |
| Horizontal Menu - | Button 7 (Fast Forward) |
| | PlayerCmnd FastForward |
| Horizontal Menu - | Button 8 (Jump to Next Play) |
| | set currentPlay = currentPlay + 1 |
| | set ff = firstFrame (currentPlay) |
| | PlayerCmnd "Goto $ff" |
| Horizontal Menu - | Button 9 (Switch Cameras) |
| | SelectNextCameraAngle |
| Vertical Menu- | Button 1 (Video Player) |
| | Continue |
| Vertical Menu- | Button 2 (Go to the Play Browser) |
| | Goto FlowChart B (see FIG. 18) |
| Vertical Menu- | Button 2 (Go to the Space Browser) |
| | Goto FlowChart C (see FIG. 19) |
| Vertical Menu- | Button 2 (Go to the Filter) |
| | Goto FlowChart D (see FIG. 20) |

Figure 18:
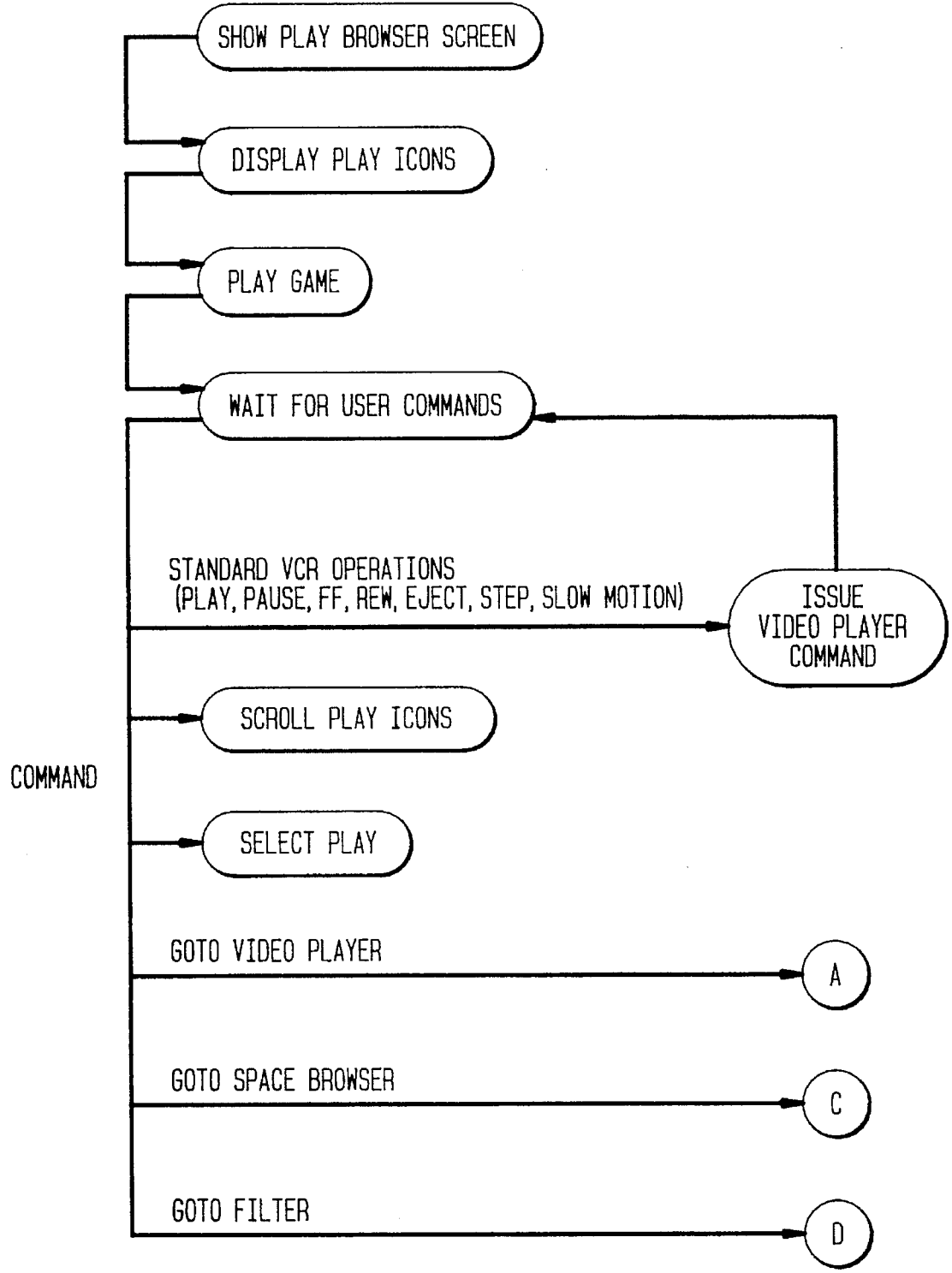

Flow Chart B shown in FIG. 18 relates to the Play Browser and will be described next.
Show Play Browser Screen
  Display the screen shown in FIG. 21.
  Redirect the output of the Video Player to the small video screen in FIG. 21.
  Scroll the play icon reel (see FIG. 21) until the current play appears
  Highlight the icon corresponding to the current play (colored border herein shown as a highlight around the icon at bottom center in FIG. 21)
  Issue the following command: PlayerCmnd Play
Wait for User Commands
  Continue playing the video until a command is issued by the viewer either by clicking on one of the buttons shown in FIG. 21 or using a remote control device. The commands associated with the horizontal and vertical menus are interpreted in the same way indicated in Flow Chart A, shown in FIG. 15. Additional commands available in the play icon reel are processed as follows:
Scroll Play Icons
  The arrow buttons shown on top of the play icon reel can be used to scroll the plays back and forth until the desired segment appears. At all times there should be a highlight box (colored border surrounding an icon) to indicate the active icon. The system will automatically determine if there is video for a given play or not. If there is no video for a particular play, the system will display a thin vertical rectangle instead of a normal play icon. Notice that the system will update the position of the highlight box as the video playback continues.

Select a Play

At any given time the viewer can choose to "jump" to the portion of the video corresponding to the highlighted icon simply by clicking in the icon itself or through an equivalent key-press in the remote control. The system will respond by jumping to the requested portion of the video where playback resumes.

Figure 19:
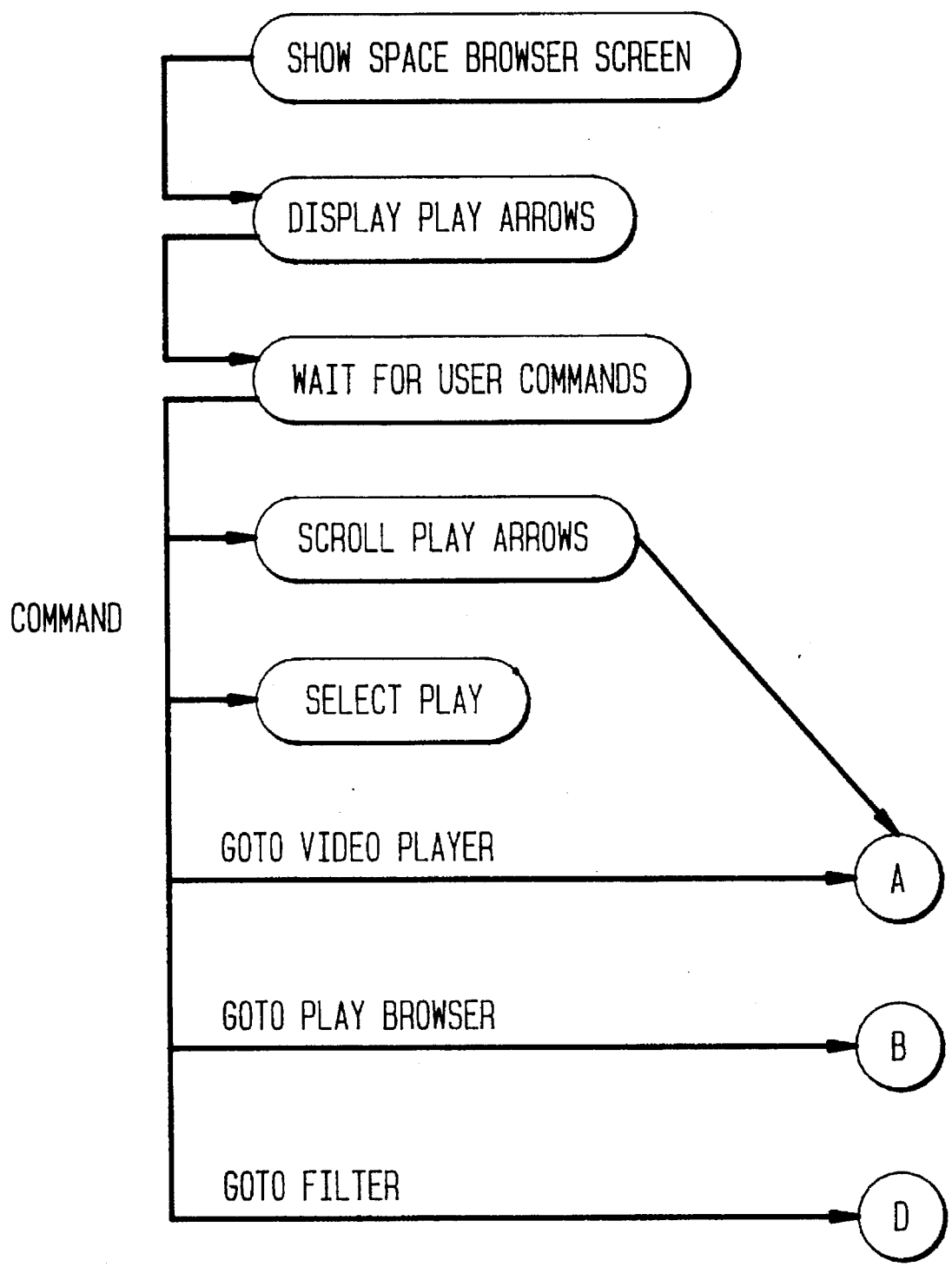

Flow Chart C shown in FIG. 19 relates to the Space Browser and will be described next.

Show Space Browser Screen

Issue the following command: PlayerCmnd Pause Display the screen shown in FIG. 22.

Scroll the field (see FIG. 22) until the current play arrow appears.

Highlight the arrow corresponding to the current play (actually a yellow border, indicated herein by the bright border around the arrow across the center of the field in FIG. 22.

Wait for User Commands

Figure 15:
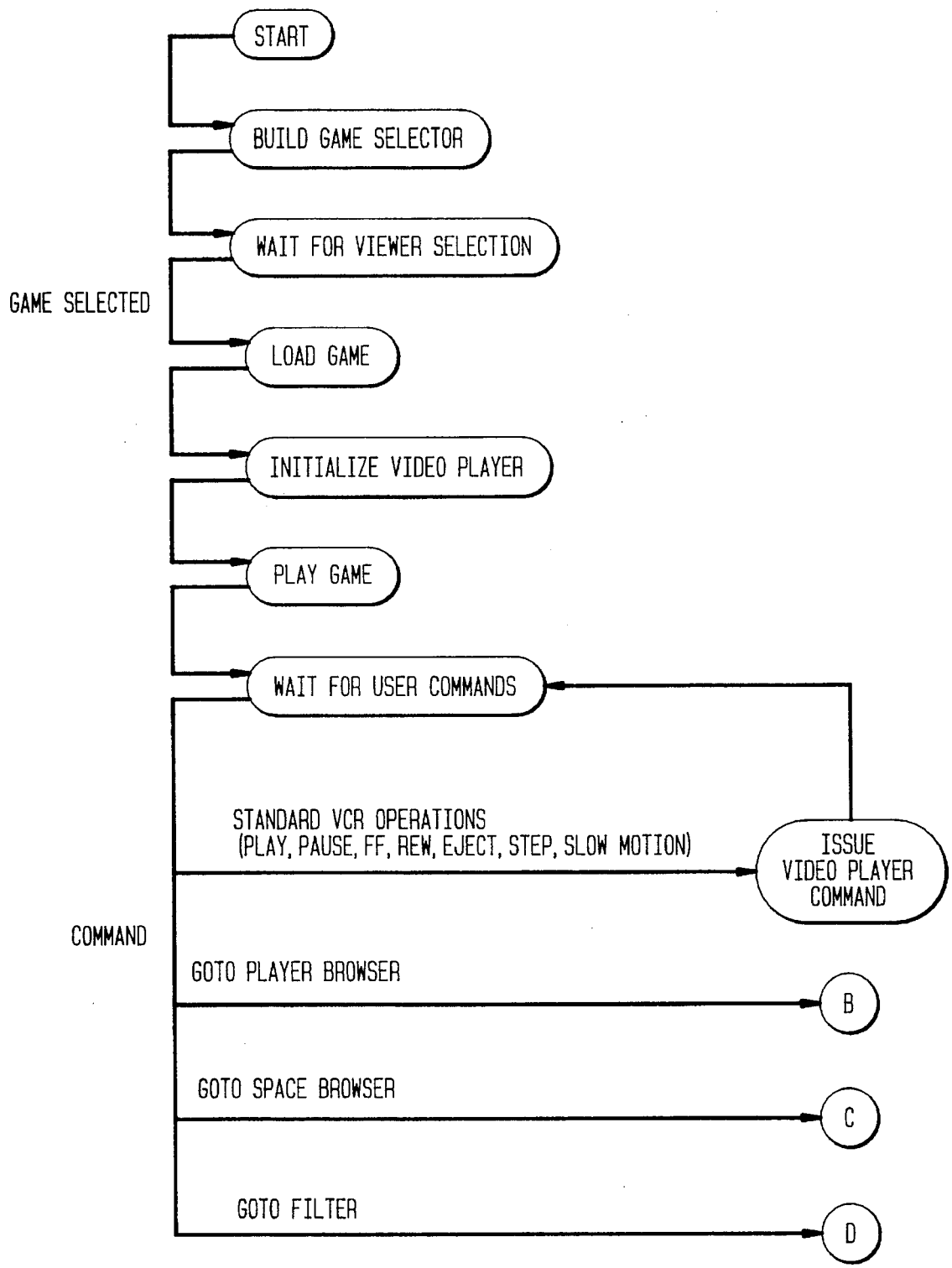

The commands associated with the horizontal and vertical menus are interpreted in the same way indicated in Flow Chart A, shown in FIG. 15. Additional commands available in the field are processed as follows:

Scroll Play Arrows

The yard-line markers at the top and bottom of the football field can be used to scroll the plays back and forth until the desired segment appears. At all times there should be a highlight box to indicate the active play arrow. The system will automatically determine if there is video for a given play or not. If there is video for a particular play, the system will display four icons in the film strip region at the bottom of the screen. These icons are representative of the type of action that occurred in the play.

Selecting a Play

At any given time the viewer can choose to "jump" to the portion of the video corresponding to the highlighted icon simply by clicking in the icon itself or through an equivalent key-press in the remote control. The system will respond by jumping to the requested portion of the video, returning to the main video window, and continue playing.

Figure 20:
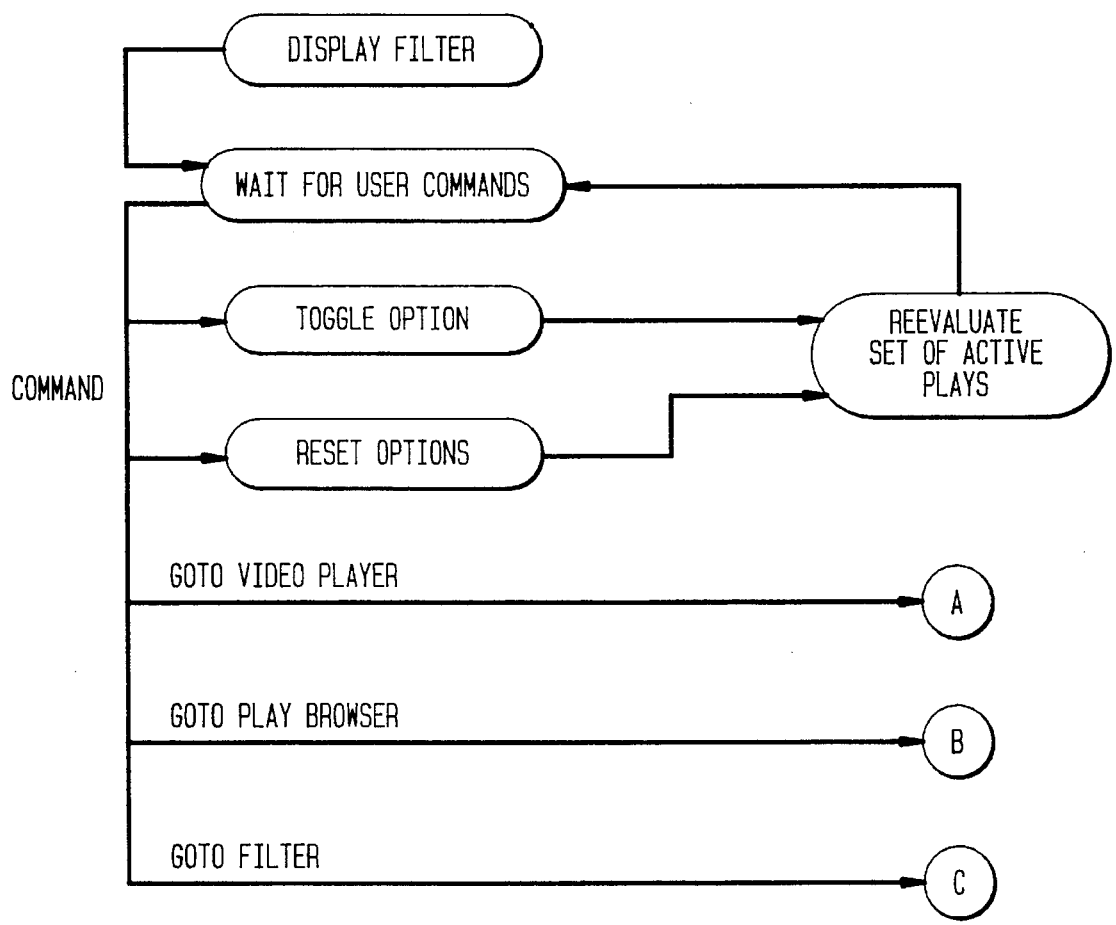

Flow Chart D shown in FIG. 20 relates to the Filter and will be described next.

Show Filter Screen

Issue the following command: PlayerCmnd Play

Display the screen shown in FIG. 23

Wait for User Commands

The commands associated with the vertical menu are interpreted in the same way indicated in Flow Chart A shown in FIG. 15 with the difference that only the plays selected with the filter options are active in the other browsers.

The other commands associated with the filter are interpreted as follows:

Categories and Options

Teams: Home and Visitor

Periods: First, Second, Third and Fourth Quarter

Highlights: Scores, Turnovers, All Other Plays

Play Types: Pass, Run, All Other Play

Each one of these categories can be toggled on and off by means of a pointing device or remote control. Whenever an option is toggled, the system will reevaluate the set of active plays accordingly. A message indicating the number of active plays is displayed at the top-right corner of the screen. Other commands include jumps to the other screens in the system and a reset button that activates all the options at once.

While the invention has been further described and explained by way of exemplary embodiments using videos relating to American Football, it is understood that the method in accordance with the invention is not at all so restricted and is fully applicable to other domains. It is further understood that the present invention is preferrably implemented by means of programmable digital computer apparatus including data storage capability. Video and sound tape recording and playback apparatus are likewise applicable in the implementation of the invention.

We claim:

1. A computer-implemented method for use by a user for management of video data in a stored video stream, said video stream including a plurality of video shots wherein each shot comprises a sequence of frames, said method comprising the steps of:

(a) defining and storing in memory on a frame-sequence axis a time-based model of said video stream;

(b) defining and storing in memory on said frame-sequence axis at least one of
  (1) a space-based model of said video stream,
  (2) an object-based model of said video stream, and
  (3) an event-based model of said video stream;

(c) selectively scanning through such of said models as have been defined;

(d) identifying time, space, object, and/or event segments of interest in such of said models as have been defined; and (e) selecting for viewing portions of said video stream associated with said segments of interest.

2. A computer-implemented method in accordance with claim 1, wherein step (a) comprises loading said time-based model of said video stream in a Time Browser for display to said user for selectively scanning.

3. A computer-implemented method in accordance with claim 2, wherein step (b) comprises loading at least one of said space-based model of said video stream, said object-based model of said video stream, and said event-based model of said video stream into a respective browser for display to said user for selectively scanning.

4. Apparatus including computer for use by a user for management of video data in a video stream stored in a video library, said video stream including a plurality of video shots wherein each shot comprises a sequence of frames, said apparatus comprising:

video selector means for selecting a video by said user from a video library;

video server means for accessing said video library;

video player means coupled to said video server means and to said video selector means for defining and storing in said video library on a frame-sequence axis a time-based model of said video stream;

said video player means being coupled to said video selector means for defining and storing in said video library on said frame-sequence axis at least one of
  (1) a space-based model of said video stream,
  (2) an object-based model of said video stream, and
  (3) an event-based model of said video stream; and browser means for enabling said user to selectively scan through such of said models as have been defined and select segments of interest therefrom;

filter means for selecting for viewing portions of said video stream associated with said segments of interest.

5. Apparatus in accordance with claim 4 wherein said video player accepts requests from said user and translates them into commands for said video server.

6. Apparatus in accordance with claim 5 wherein said video player includes a viewing device and decodes said video data and displays said video data in said viewing device.

7. Apparatus in accordance with claim 5 wherein said video player provides functions of
(1) standard VCR operations such as Play, Pause, Stop, FastForward, Rewind, Step Forward and Step Back, and
(2) NextEvent and PreviousEvent so as to enable direct access (jump) to pre-determined points in said video stream associated with said segments of interest; and
(3) camera selection, including in cases where multiple camera streams exist for a same video recording, said video player lets said user select a preferred angle.

8. Apparatus including computer for use by a user for management of video data in a video stream stored in a video library, said video stream including a plurality of video shots wherein each shot comprises a sequence of frames, said apparatus comprising:
video selector means for selecting a video by said user from a video library;
video server means for accessing said video library;
video player means coupled to said video server means and to said video selector means for defining and storing in said video library on a frame-sequence axis at least one of
(1) a time-based model of said video stream,
(2) a space-based model of said video stream,
(3) an object-based model of said video stream, and
(4) an event-based model of said video stream;
browser means for enabling said user to selectively scan through such of said models as have been defined and select events of interest therefrom; and
filter means for selecting for viewing portions of said video stream associated with segments of interest.

9. Apparatus in accordance with claim 8 wherein said video player accepts requests from said user and translates them into commands for said video server.

10. Apparatus in accordance with claim 9 wherein said video player includes a viewing device and decodes said video data and displays said video data in said viewing device.

11. Apparatus in accordance with claim 10 wherein said video player provides functions of
(1) standard VCR operations such as Play, Pause, Stop, FastForward, Rewind, Step Forward and Step Back, and
(2) NextEvent and PreviousEvent so as to enable direct access (jump) to pre-determined points in said video stream associated with said event; and
(3) camera selection, including in cases where multiple camera streams exist for a same video recording, said video player lets said user select a preferred angle.

12. A computer-implemented method for use by a user for management of video data in a stored video stream, said video stream including a plurality of video shots wherein each shot comprises a sequence of frames, said method comprising the steps of:
(a) retrieving from a database a list of sequences available;
(b) building a selection window;
(c) loading into a memory device a user selected of one of said sequences;
(d) hiding said selection window;
(e) showing a display window for displaying said user selected one of said sequences;

(f) displaying said user selected one of said sequences;
(g) entering a user command to play said selected one of said sequences;
(h) entering a user command for selecting a given portion of said selected one of said sequences; and
(i) entering a user command for selecting at least one of
(1) a space-based model of said video stream,
(2) an object-based model of said video stream, and
(3) an event-based model of said video stream.

13. A computer-implemented method for use by a user for the management of video data in a stored video stream in accordance with claim 12, wherein when said space-based model of said video stream has been selected, said method comprises the steps of:
(j) displaying a space browser screen, said space browser screen including a screen portion for displaying said video stream and icons representative of space-based characteristics of said video stream;
(k) entering a user command relating to a selected space-based characteristic of said video stream; and
(l) displaying a portion of said video stream associated with said selected space-based characteristic of said video stream.

14. A computer-implemented method for use by a user for the management of video data in a stored video stream in accordance with claim 12, wherein when said object-based model of said video stream has been selected, said method comprises the steps of:
(j) displaying an object browser screen, said object browser screen including a screen portion for displaying said video stream and icons representative of object-based characteristics of said video stream;
(k) entering a user command relating to a selected object-based characteristic of said video stream; and
(l) displaying a portion of said video stream associated with said selected object-based characteristic of said video stream.

15. A computer-implemented method for use by a user for the management of video data in a stored video stream in accordance with claim 12, wherein when said event-based model of said video stream has been selected, said method comprises the steps of:
(j) displaying an event browser screen, said event browser screen including a screen portion for displaying said video stream and icons representative of event-based characteristics of said video stream;
(k) entering a user command relating to a selected event-based characteristic of said video stream; and
(l) displaying a portion of said video stream associated with said selected event-based characteristic of said video stream.

16. Apparatus for use for use by a user for management of video data in a stored video stream, said video stream including a plurality of video shots wherein each shot comprises a sequence of frames, said apparatus including means for entering user commands and comprising:
retrieval means for retrieving from a database a list of sequences available;
stored software means for building a selection window;
means for loading into a memory device a user selected one of said sequences;
means for hiding said selection window;
display means for showing a display window for displaying said user selected one of said sequences;

stored software means for implementing at least one of
a user-selectable space-based model of said video stream,
a user-selectable object-based model of said video stream, and
a user-selectable event-based model of said video stream.

17. Apparatus for use by a user for the management of video data in a stored video stream in accordance with claim 16, wherein said apparatus comprises:
  (j) means for displaying a space browser screen on said display means, said space browser screen including a screen portion for displaying said video stream and icons representative of space-based characteristics of said video stream; and
  (l) means for displaying on said display means a portion of said video stream associated with a selected space-based characteristic of said video stream upon said user having entered a user command relating to said selected space-based characteristic of said video stream.

18. Apparatus for use by a user for the management of video data in a stored video stream in accordance with claim 16, wherein said apparatus comprises:
  (j) means for displaying a object browser screen on said display means, said object browser screen including a screen portion for displaying said video stream and icons representative of object-based characteristics of said video stream; and
  (l) means for displaying on said display means a portion of said video stream associated with a selected object-based characteristic of said video stream upon said user having entered a user command relating to said selected object-based characteristic of said video stream.

19. Apparatus for use by a user for the management of video data in a stored video stream in accordance with claim 16, wherein said apparatus comprises:
  (j) means for displaying a event browser screen on said display means, said event browser screen including a screen portion for displaying said video stream and icons representative of event-based characteristics of said video stream; and
  (l) means for displaying on said display means a portion of said video stream associated with a selected event-based characteristic of said video stream upon said user having entered a user command relating to said selected event-based characteristic of said video stream.

20. A method for use by a user for management of video data in a stored video stream implemented on computer controlled apparatus including video replay means, said video stream including a plurality of video shots wherein each shot comprises a sequence of frames, said method comprising the steps of:
  (a) retrieving from a database a list of sequences available;
  (b) building a sequence selector;
  (c) loading a user-selected sequence;
  (d) displaying said user-selected sequence;
  (e) entering a user command for selecting one of
    (1) an event-based model of said video stream,
    (2) a space-based model of said video stream, and
    (3) an object-based model of said video stream.

21. A method for use by a user for the management of video data in a stored video stream in accordance with claim 20, wherein upon the selection of said event-based model of said video stream, said method comprises the steps of:
  (f) displaying an event-based screen, including event-based icons; and
  (g) displaying said user-selected sequence in accordance with user selection of events indicated by said icons.

22. A method for use by a user for the management of video data in a stored video stream in accordance with claim 20, wherein upon the selection of said object-based model of said video stream, said method comprises the steps of:
  (f) displaying an object-based screen, including object-based icons; and
  (g) displaying said user-selected sequence in accordance with user selection of objects indicated by said icons.

23. Apparatus including computer for use by a user for management of video data in a video stream stored in a video library, said video stream including a plurality of video shots wherein each shot comprises a sequence of frames, said apparatus comprising:
  video selector means for selecting a video by said user from a video library;
  video server means for accessing said video library;
  video player means coupled to said video server means and to said video selector means for defining and storing in said video library on a frame-sequence axis a time-based model of said video stream;
  said video player means being coupled to said video selector means for defining and storing in said video library on said frame-sequence axis at least one of
    (1) a space-based model of said video stream,
    (2) an object-based model of said video stream, and
    (3) an event-based model of said video stream; and
  browser means for enabling said user to selectively scan through such of said models as have been defined and select segments of interest therefrom;
  filter means for selecting for viewing portions of said video stream associated with said segments of interest wherein only portions selected by said filter means are active in said browser means.

24. Apparatus including computer for use by a user for management of video data in a video stream stored in a video library, said video stream including a plurality of video shots wherein each shot comprises a sequence of frames, said apparatus comprising:
  video selector means for selecting a video by said user from a video library;
  video server means for accessing said video library;
  video player means coupled to said video server means and to said video selector means for defining and storing in said video library on a frame-sequence axis a time-based model of said video stream;
  said video player means being coupled to said video selector means for defining and storing in said video library on said frame-sequence axis at least one of
    (1) a space-based model of said video stream,
    (2) an object-based model of said video stream, and
    (3) an event-based model of said video stream; and
  browser means for enabling said user to selectively scan through such of said models as have been defined and select segments of interest therefrom;
  filter means for selecting for viewing portions of said video stream associated with said segments of interest wherein only portions selected by said filter means in one of said models are active in said browser means in association with the others of said models.

* * * * *